(12) United States Patent
Seymour et al.

(10) Patent No.: US 7,490,684 B2
(45) Date of Patent: Feb. 17, 2009

(54) SELF-PROPELLED INFANT STROLLER

(76) Inventors: Craig A. Seymour, 303 W. Perry St., Pittsfield, IL (US) 62363-1029; Gretchen Seymour, 303 W. Perry St., Pittsfield, IL (US) 62363-1029

( * ) Notice: Subject to any disclaimer, the term of this patent is extended or adjusted under 35 U.S.C. 154(b) by 345 days.

(21) Appl. No.: 11/509,262

(22) Filed: Aug. 24, 2006

(65) Prior Publication Data
US 2008/0047766 A1 Feb. 28, 2008

(51) Int. Cl.
*B60K 1/04* (2006.01)
(52) U.S. Cl. .................... 180/65.1; 180/65.5; 280/47.38
(58) Field of Classification Search ............. 280/47.38; 180/65.1, 65.5, 65.6
See application file for complete search history.

(56) References Cited

U.S. PATENT DOCUMENTS

| | | | |
|---|---|---|---|
| 2,494,489 A | | 1/1950 | Raucher |
| 4,629,950 A | * | 12/1986 | Ching .................... 318/285 |
| 4,685,688 A | | 8/1987 | Edwards |
| 5,168,947 A | * | 12/1992 | Rodenborn ............... 180/19.1 |
| D345,720 S | | 4/1994 | Pohl |
| 5,351,774 A | * | 10/1994 | Okamoto .................. 180/65.1 |
| 5,873,425 A | * | 2/1999 | Yang ...................... 180/65.6 |
| 5,937,961 A | * | 8/1999 | Davidson ................. 180/166 |
| 6,148,942 A | * | 11/2000 | Mackert, Sr. ............. 180/65.6 |
| 6,360,836 B1 | * | 3/2002 | Milano et al. ............. 180/65.6 |
| 7,004,272 B1 | * | 2/2006 | Brown et al. ............. 180/65.1 |
| 7,198,122 B1 | * | 4/2007 | Smith ..................... 180/12 |

* cited by examiner

*Primary Examiner*—Jeffrey J Restifo
(74) *Attorney, Agent, or Firm*—Raymond M. Galasso; Galasso & Associates, L.P.

(57) ABSTRACT

An infant stroller that can propel itself under its own power, or in other circumstances provide propulsion assistance to aid the stroller attendant so as to reduce the required effort to push a stroller over various types of terrain. The stroller having a base frame formed of a plurality of connected substantially rigid formed tubular or molded plastic members, the frame adapted to fold for storage. Provided on the frame and interfacing with the ground are a plurality of wheels of which at least one wheel is an electrically driven wheel. The stroller includes two handle arms secured to the rear portion of the frame with a handle grip bar secured to an upper portion of the arms. The handle grip has a battery compartment for receiving a rechargeable battery pack therein. The stroller includes an electrically powered drive means for providing power assist to drive one or more driven wheels over sometimes hilly, grassy or rough terrain. Once discharged, the battery can be removed and replaced with a recharged battery, or on certain embodiments the stroller can also recharge while exposed to direct sunlight. The attendant controls the stroller's electric drive by manipulating a motor control bar located near the stroller handle grip.

10 Claims, 2 Drawing Sheets

SELF-PROPELLED INFANT STROLLER

FIELD OF THE DISCLOSURE

The disclosures made herein relate generally to wheeled baby strollers for transporting infants and, more particularly, to self-propelled strollers having an electric drive means to propel the stroller, reducing the required effort to push the stroller particularly over rough ground, through grassy terrain, as well as up hills and inclines.

BACKGROUND

Push type infant strollers are well known. Such strollers comprise a wheeled frame with an infant seat secured thereon. The stroller frame is provided with a raised handle configured to allow a parent, family member or other attendant to manually push the stroller along as they walk. The infant seat is typically provided with a restraint device to prevent the infant or child from accidentally falling out of the seat. Many times the stroller is provided with a canopy to shield the child from the ultraviolet rays in sunlight, as well as shield the child from an unexpected downpour. Strollers are often used to convey children who are too young to walk independently. Infants and young children have needed to be carried for as long as parents have needed to go places and such strollers ease the burden of bearing the weight of children on long or even short walks.

The first baby carriages were introduced in England in the 1700's and were designed to be pulled by dogs or Shetland ponies. Today, many varieties of strollers are available from models that permit the child to lie down to those that maintain the child in a substantially upright position. More recent times have seen the introduction of strollers that can be pulled behind bicycles. The vast majority of infant strollers are designed to be propelled by a hand wherein the attendant exerts physical effort to push the stroller carrying the infant over sometimes hilly, rough, or gravel covered terrain. It is to the improvement of such strollers and improving the lot of parents and guardians that this inventive disclosure is directed.

While conventional push type strollers fulfill their original intent, such strollers have one or more drawbacks. One drawback, as discussed above, is that the stroller must be manually pushed by the attendant to propel it from one place to another. When pushing such a stroller on a long walk, even on smooth level pavement, such a task takes its toll and eventually becomes tiring to the person pushing the stroller. The difficulty and required effort to manually push the stroller multiplies when the stroller must be pushed up a hill, along rough or grassy terrain, or when the stroller must be pushed through a patch of gravel or along a gravel path or road. Pushing a stroller for even limited distances in such terrain can be a difficult and strenuous task. Then there are the occasions when an older person and grandparent with health issues or other limitations on physical exertion desires to take the baby out in the stroller for a walk. Difficult terrains as discussed above can place undue physical burdens on elders with health issues and present a serious health risk. Additionally, younger children or people with various physical handicaps are limited in their physical capacity to push a bulky and unwieldy stroller and so would benefit from the use of a powered stroller such as disclosed herein.

Therefore, an infant stroller which is configured to overcome the drawbacks of such push type strollers as discussed above, a stroller which either propels under its own power or provides a propulsion assist so as to reduce the physical effort required to push the stroller over various terrains, such a stroller would be useful, advantageous and novel.

SUMMARY OF THE DISCLOSURE

Accordingly, embodiments of the inventive disclosures made herein comprise various embodiments of a self-propelled infant stroller that has the capacity to propel itself under its own power, or in other circumstances to provide propulsion assistance to reduce the required effort of the attendant to push the stroller over various types of terrain.

In embodiments of the inventive disclosures made herein, a self-propelled electrically powered stroller for transporting one or more infants comprises a stroller frame configured to support the weight of an infant or child. The frame comprises a base frame having a plurality of connected substantially elongated frame members that may consists of metallic tubular or formed plastic. The base frame adapted to fold for storage and therefore to reduce the size of the stroller, thereby making the folded stroller easier to carry and to store, as well as to transport in an automobile. Provided on the frame and interfacing with the ground are a plurality of wheels of which at least one wheel is a driven wheel. The wheels are rotably secured to the stroller frame on axles and are so arranged as to stably and rollably support the stroller frame upon the ground without tipping the stroller. The stroller includes a handle assembly comprising two elongated substantially rigid handle arms secured to the rear portion of the frame. A handle grip bar is secured to an upper portion of the handles and spans between the handle arms. The handle grip bar has a battery receiving compartment with electrical contacts provided therein. The handle grip bar is configured to be grasped by a human hand for guiding or pushing the stroller along, somewhat similar to the conventional manually pushed variety of strollers. The stroller includes an electrically powered drive means configured to drive the driven wheels so as to propel the stroller over the ground. The drive means is secured to the stroller frame. A rechargeable battery pack is provided for storing and supplying electrical energy to power the drive means of the stroller over terrain. The battery pack removably secured within the battery receiving compartment of the handle grip bar. The battery has electrical contacts thereon configured to electrically engage with the contacts in the battery compartment. The battery is designed to be removable for replacement, permitting a discharged battery to be swapped out for recharging while replacing the discharged battery with a charged battery thereby permitting continued use of the self-propelled stroller. As in conventional stroller, one or more infant seats are secured to the base frame so as to ride upon the frame and wheels. A canopy is positioned above the infant seats and secured to the stroller frame. The canopy is configured to shade the infant seat from sun rays and rain during walks with the stroller outside. The stroller includes a safety power interrupt device comprising: a safety switch and a mating safety key which is removably insertable into the switch. The key must be inserted into the switch to permit electrical power to flow from the battery to the electric drive means. When the key is removed the flow of electrical power from the battery to the drive motor is interrupted and the stroller comes to a stop. The drive means incorporates a gear reduction unit that functions to transform the shaft revolution speed at the motor to a lower speed of revolution at the wheels and in so doing the transmission increases the limited torque present at the motor shaft to a higher torque value so as to drive the stroller driven wheel or wheels. The gear reduction means, together with the inertia of the drive motor and friction of the gear train are able to bring the stroller to a stop when the power is removed, such as when the safety key is removed from the switch. A lanyard is permanently attached at one end to the safety key while the other end of the lanyard has a hook or other means of attaching the lanyard to an attendant or the clothing of an attendant. The hook configured for attaching the lanyard to or around a stroller attendant, for example to the belt or belt loop on the attendant's clothing, or to wrap the lanyard around the waist of the person and secure the loop closed with the hook. These are illustrative only. Other means of attaching the safety lanyard to the stroller attendant can be utilized without deviating from the intent of the inventive disclosures herein. The lanyard and safety switch work together such that if the stroller gets away from the attendant, then the lanyard pulls the safety key out of the safety switch on the stroller grip handle, thereby removing power from the stroller drive means and the stroller comes to a stop as discussed above. The safety switch is a safety device and not used to control the drive means in normal use. To control the power to the drive motor the stroller has an electric drive motor control bar for selectably providing or interrupting electrical power from the battery to the drive means. The motor control bar is conveniently placed in a distally spaced from and substantially parallel relationship to the handle grip bar so that the motor control bar may be grasped together with the handle grip bar in one hand. The motor control bar configured to be compressed against the grip bar by a human hand when the attendant wishes the stroller to be propelled by the drive means. The motor control bar is connected to an electrical drive switch wherein compressing the motor control bar against the handle grip provides power to the drive means and wherein releasing the hand compression on the motor control bar interrupts the power to the drive means.

In at least one embodiment of the inventive disclosures herein, the self-propelled stroller frame comprises tubular aluminum, tubular steel, or reinforced plastic, or some combination of those, and the wheels comprise molded plastic wheel having a rubber tread or tire secured to the periphery thereof.

In at least one embodiment of the inventive disclosures herein, the electrically powered drive means comprises a wheel drive shaft, the shaft rotably and torsionally connect to at least one driven wheel. The drive means has a gear reduction transmission having an output shaft connected to the wheel drive shaft wherein the output shaft transmits rotary motion and torque to the wheel drive shaft. The gear reduction transmission is secured onto the stroller frame. The drive means includes an electric drive motor secured to the gear reduction transmission. The motor drive shaft is connected to the input shaft of the transmission such that the motor transmits rotary motion and torque through the transmission to the driven wheels of the stroller so as to propel the stroller.

In at least one embodiment of the inventive disclosures herein, the stroller transmission further comprises a foot operated means of selectively engaging or disengaging the transmission output shaft from the wheel drive shaft, wherein disengaging the transmission permits the stroller to be manually propelled without electrical power.

In at least one embodiment of the inventive disclosures herein, the plurality of wheels consists of four wheels, and the base frame has a back member secured to two opposing side members. Each side member of the frame has two wheels located generally at opposing ends of the side member.

In at least one embodiment of the inventive disclosures herein, the stroller battery pack is a 24 volt rechargable battery pack, and the electric drive motor comprises a 12 to 19 volt rated electric motor.

In at least one embodiment of the inventive disclosures herein, the stroller has one driven wheel, a rear driven wheel, where the other wheels are free rolling and undriven.

In at least one embodiment of the inventive disclosures herein, the stroller has two driven wheels, both are rear driven wheels, where the other wheels are free rolling and undriven.

In at least one embodiment of the inventive disclosures herein, the stroller further comprising a solar cell assembly secured to a top portion of the canopy over the infant seat. The solar cell assembly generates electrical power from solar energy to charge the battery pack of the stroller.

In at least one embodiment of the inventive disclosures herein, the stroller solar cell assembly is a 24 volt solar cell assembly secured to a top portion of the canopy and the solar cell assembly provides electrical power to charge the 24 volt battery pack.

It is an objective of the inventive disclosure made herein to provide an infant stroller which either propels under its own power or provides a propulsion assist to the person guiding the stroller so as to reduce the physical effort required to roll the stroller along various terrain, particularly up hills, through rough or grassy terrain, or through gravel or sand.

It is an objective of the inventive disclosure made herein to provide an infant stroller that provides a safety shut off switch to remove power from the stroller drive means when the stroller gets away from the attendant guiding the stroller.

It is an objective of the inventive disclosure made herein to provide an infant stroller using a storage battery to provide electrical power and wherein one means of recharging the battery is to place the stroller outside in the sunlight. The solar charging panels reduce the dependence upon energy from burning fossil fuels to power the stroller thereby making the stroller more environmentally friendly.

It is an objective of the inventive disclosure made herein to provide an infant stroller that uses a drive means that can be controlled by compressing the motor control bar against the handle grip, and stops automatically when the motor control bar is released, and where the handle grip and motor control bar can be grasped by one hand.

It is an objective of the inventive disclosure made herein to provide an infant stroller utilizing a removable rechargeable battery pack placed into the handle of the stroller. Wherein a discharged battery pack can be removed from the stroller and replaced with a charged battery pack so that the stroller can continue to operate without stopping for an extended period to recharge the battery.

These and other objects of the invention made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
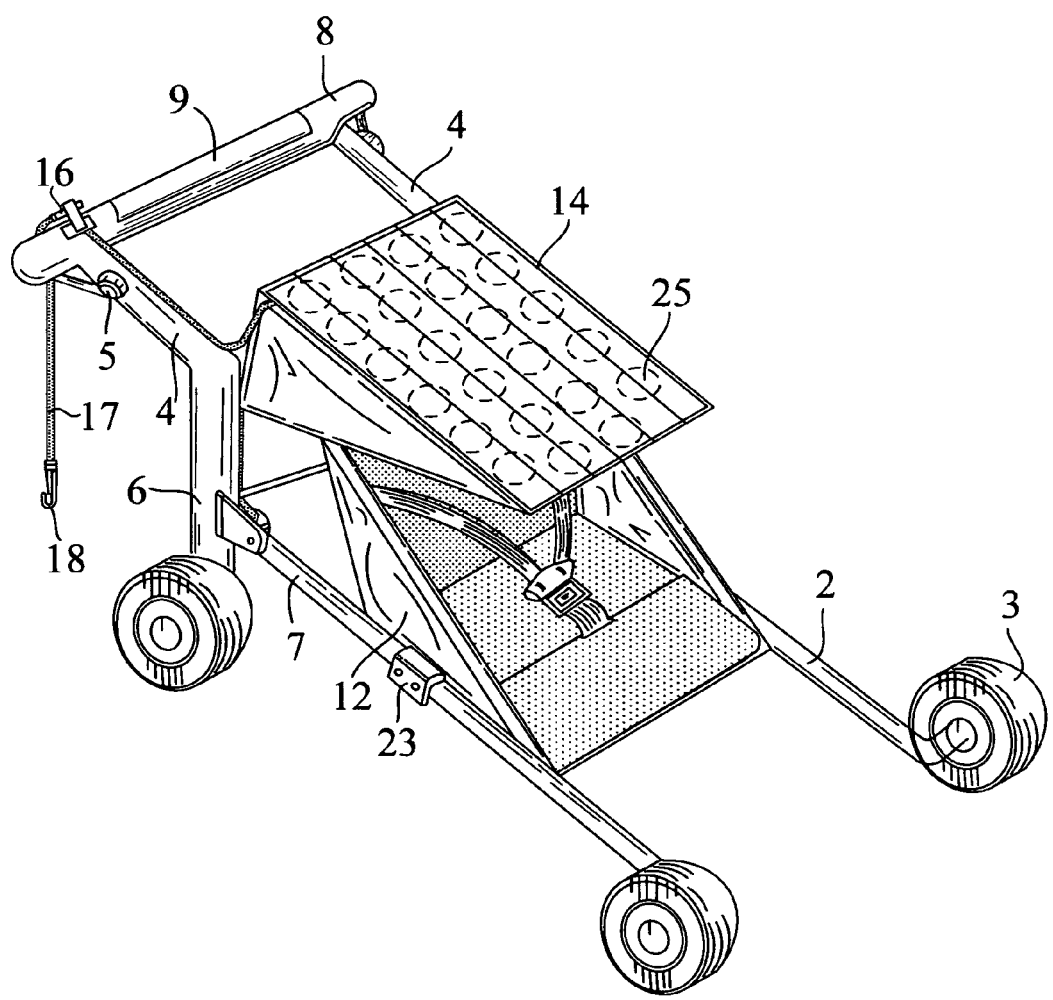
FIG. 1 depicts a perspective view of one embodiment of an infant stroller in accordance with the inventive disclosures herein.
Figure 2:
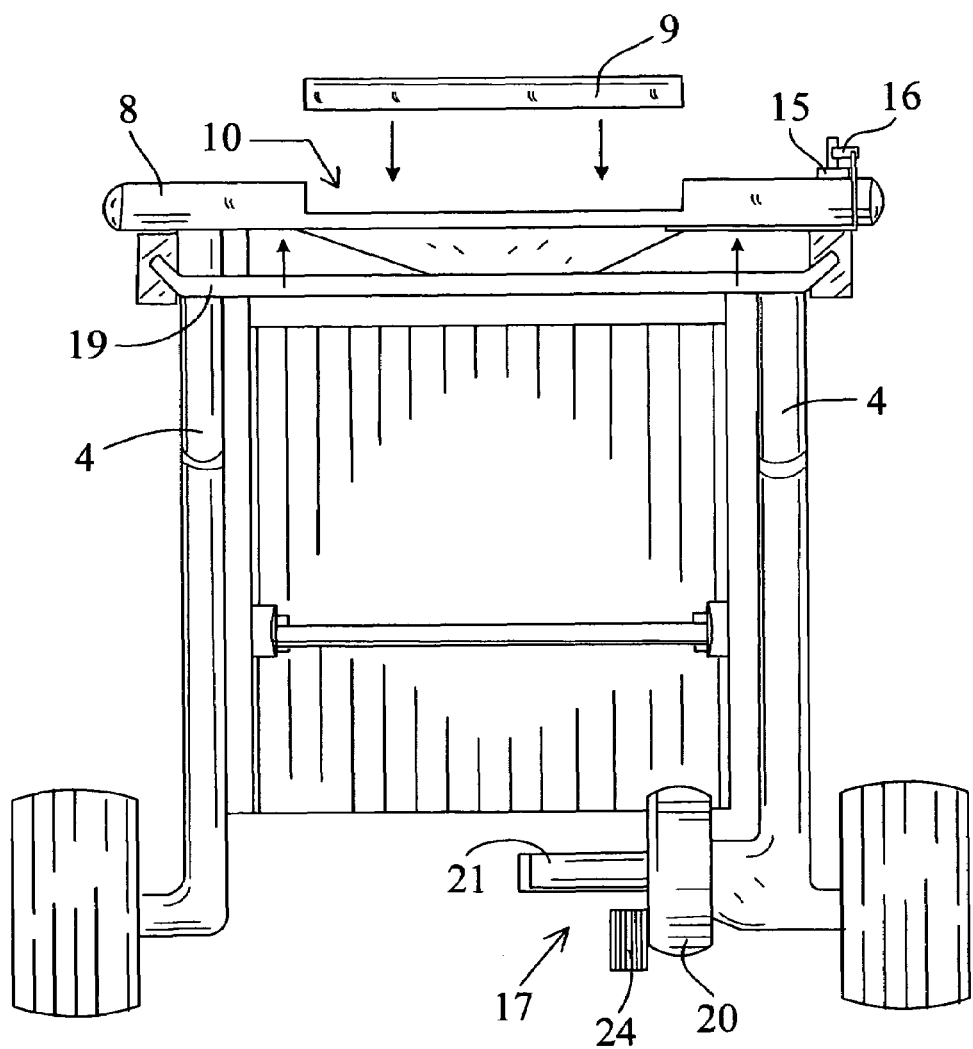
FIG. 2 depicts a rear view of one embodiment of an infant stroller in accordance with the inventive disclosures herein.

Turning now to FIG. 1 and FIG. 2:

FIG. 1 depicts a perspective view of one exemplary embodiment of an infant stroller in accordance with the inventive disclosures herein. FIG. 2 depicts a rear view of the exemplary embodiment of an infant stroller in accordance with the inventive disclosures herein. A self-propelled electrically powered stroller 1 for transporting one or more infants comprises a stroller frame configured to support the weight of an infant, the stroller frame comprising a base frame 2 comprising a plurality of connected substantially rigid formed tubular members wherein the base frame is adapted by a locking hinge 23 to fold for storage. A plurality of wheels 3 are rotably secured to the stroller frame on axles such that the wheels are free to roll, the wheels are so arranged so as to stabily and rollably support the stroller frame upon ground. The stroller frame includes a handle assembly comprising: two elongated substantially rigid handle arms 4, the arms 4 having an upper end 5 and an opposing lower end 6. The arms are foldably secured at a lower end 6 to the rear portion 7 of the base frame. A handle grip bar 8 is secured along opposing end portions to the upper ends of the elongated handle arms 4, the handle grip 8 configured to be grasped by a human hand for guiding or pushing the stroller. The handle grip bar 8 has a battery receiving compartment 10 with electrical contacts therein for receiving a rechargeable battery 9 pack into the grip bar. The battery pack fits into the grip bar so as to form a smooth continuous grip bar.

An electrically powered drive means 11 is secured to the stroller frame. The drive means is configured to drive the driven wheels so as to propel the stroller over the ground, either totally self-propelled, or to provide a propulsion assist such as to make the stroller easier for an attendant to propel over rough or hilly terrain. Removably secured within the grip bar is a rechargeable battery pack 9 for storing and supplying electrical energy to power the drive means 11, the battery pack having electrical contacts thereon for electrically engaging with the contacts in the battery compartment 10 such as to enable electrical current to flow between the battery and the stroller electrical components. One infant seat 12 is secured to the base frame 2 so as to ride upon the frame and wheels. In many cases the stroller requires only a single infant seat, but in other cases strollers configured to transport twins or even triplets are envisioned, and these larger strollers particularly benefit from the propulsion assisted electric drive of the present inventive disclosure. A canopy 14 is positioned above the infant seat 12. The canopy 14 is secured to the stroller frame to shade the infant seat and the occupant from the direct ultraviolet rays of the sun. As an added safety feature, a safety power interrupt device is provided. The safety power interrupt device comprises a safety switch device 15 secured to the handle grip bar. A safety key 16 is removably received into the safety switch 15, wherein removing the safety key 16 from the switch interrupts electrical power from the battery to the drive means such as to stop the drive means. When the power is removed the frictional and rotary inertia of the drive means brakes the rolling motion of the stroller, bringing the stroller to a complete stop. A lanyard 17 has one end secured to the safety key and an opposing end secured to a hook or clasp 18. The hook 18 is configured to attach to or around a stroller operator. The lanyard 17 and safety key 16 cooperate such as to pull the safety key 16 out of the safety switch 15 if stroller manages to get away from the operator, thereby removing the power and bringing the stroller to a stop. A drive motor control means is provided. The drive motor control means having a spring return electrical drive off-on switch for selectably providing or interrupting electrical power from the battery to the drive means. A motor control bar 19 is distally spaced from and substantially parallel to the handle grip bar 8. The motor control bar 19 is configured to be compressible against the grip bar 8 by the palm and fingers of a human hand. The motor control bar connected to the electrical drive switch wherein compressing the motor control bar against the handle grip provides power to the drive means and wherein releasing the hand compression on the motor control bar interrupts the power. The motor control bar being of the spring return type such that when the hand grip is released from the motor control bar then the power to the drive means is interrupted and the stroller comes to a stop. The drive means in FIG. 1 comprises a gear reduction transmission 20 having an output shaft transmitting rotary motion and torque to the driven wheel 22. An electric drive motor 21 has its motor drive shaft connected to the input shaft of the transmission 20 such that the motor transmits rotary motion and torque through the transmission 20 and to the drive wheel 22. The base frame includes two locking folding means 23, the locking folding means permitting the frame to fold so as to reduce the size of the stroller for transport or storage.

The frame of the stroller depicted in FIG. 1 and FIG. 2 comprises tubular aluminum or molded reinforced plastic, and the wheels comprise rubber treads or tires over molded plastic wheel rims or wheel base structures. The invention is not limited to the materials disclosed herein. Other materials may be used as would be known to one skilled in the art without deviating from the scope and intent of the inventive disclosures herein. The transmission further comprises a foot operated means of selectively engaging or disengaging 24 the transmission output shaft from the wheel drive shaft. The foot operated disengaging means permits the stroller to be manually propelled without electrical power when the power assist is not required. Disengaging the transmission from the wheels also makes the stroller free rolling, and therefore better suited to being manually pushed when that is desired.

In the preferred embodiment the rechargeable battery pack is a 24 volt rechargeable storage battery pack, and the drive motor is rated between 12 to 19 volts.

Certain embodiments of the self-propelled stroller include a solar cell array 25 secured to the top sun facing portion of the canopy as shown in FIG. 1. The solar cell array is electrically connected through the wiring of the stroller to the rechargeable battery pack. On sunny days the solar cell array provides electrical power to charge the 24 volt battery pack. The battery pack may also be charged by placing the battery into a battery charger and plugging the charger into a conventional electrical outlet. Use of the solar array for charging makes the stroller more environmentally friendly by reducing the burning of fossil fuels at utility power stations so as to charge the battery pack.

The discussed construction, illustrations and sequence of operation is for one embodiment of the invention but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents as can be reasonably included within the spirit and scope of the appended claims.

What is claimed is:

1. A self-propelled electrically powered stroller for transporting one or more infants, the stroller comprising:
    a stroller frame configured to support the weight of an infant, the frame comprising:
        a base frame comprising a plurality of connected substantially rigid formed elongated members, the base frame adapted to fold for storage;
        a plurality of wheels wherein at least one wheel is a driven wheel, the wheels rotably secured to the stroller frame, the wheels arranged to stably and rollably support the stroller frame upon ground;
        a handle assembly comprising:
            two elongated substantially rigid handle arms, the arms having an upper and an opposing lower end, the arms foldably secured at a lower end to the rear portion of the base frame; and
            a handle grip bar having a battery receiving compartment with electrical contacts secured therein, the handle grip bar secured along opposing end portions to the upper ends of the elongated handle arms, the handle grip bar configured to be grasped by a human hand for guiding or pushing the stroller;
    an electrically powered drive means for driving the at least one driven wheel so as to propel the stroller over the ground, the drive means secured to the stroller frame;
    a rechargeable battery pack for storing and supplying electrical energy to power the drive means, the battery pack removably secured within the battery receiving compartment of the handle grip bar, the battery pack having electrical contacts thereon for electrically engaging with the contacts in the battery compartment;
    one or more infant seats secured to the base frame so as to ride upon the frame and wheels;
    a canopy positioned above the infant seats, the canopy secured to the stroller frame, the canopy configured to shelter the infant seat from sun rays and rain;
    a safety power interrupt device, the safety power interrupt device comprising:
        a safety switch device secured to the handle grip bar;
        a safety key removably received into the safety switch, wherein removing the safety key from the switch interrupts electrical power from the battery to the drive means such as to stop the drive means, wherein frictional and rotary inertia of the drive means brakes rolling motion of the stroller; and
        a lanyard having two ends, one end secured to the safety key, an opposing end having a hook secured thereto, the hook configured to retentively engage onto a stroller operator, the lanyard and safety key cooperating so as to pull the safety key out of the safety switch if stroller gets away from the operator so as to brake the stroller; and
    a drive motor control means, the drive motor control means comprising:
        a spring return electrical drive off-on switch for selectably providing or interrupting electrical power from the battery to the drive means; and
        a motor control bar distally spaced from and substantially parallel to the handle grip bar, the motor control bar positioned and configured to be operable by attendant's fingers, wherein the attendant has a palm of a hand resting on the grip bar and wherein the attendant manipulates the motor control bar with fingers of the hand, the motor control bar connected to the electrical drive switch wherein compressing the motor control bar against the handle grip provides power to the drive means and wherein releasing the hand compression on the motor control bar interrupts the power.

2. The stroller of claim 1, wherein the frame material is selected from the group consisting of tubular aluminum, tubular steel, reinforced plastic; and wherein the wheels comprise rubber treads secured over plastic wheels.

3. The stroller of claim 2, wherein the electrically powered drive means comprises:
    a wheel drive shaft, the shaft rotably and torsionally connected to the at least one driven wheel;
    a gear reduction transmission having an input shaft and an output shaft, the output shaft connected to the wheel drive shaft wherein the output shaft transmits rotary motion and torque to the wheel drive shaft, the gear reduction transmission secured to the stroller frame; and
    an electric drive motor having a drive shaft, the drive motor secured to the gear reduction transmission, the motor drive shaft connect to the input shaft of the transmission, wherein the motor transmits rotary motion and torque to the input shaft.

4. The stroller of claim 3, wherein the transmission further comprises a foot operated means of selectively engaging/disengaging the transmission output shaft from the wheel drive shaft, wherein disengaging the transmission permits the stroller to be manually propelled without electrical power.

5. The stroller of claim 4, wherein the plurality of wheels consists of four wheels, and wherein the base frame comprise a back member secured to two opposing side members, each side of the frame having two wheels located generally at opposing ends of the side member.

6. The stroller of claim 5 further comprising a solar cell assembly secured to a top portion of the canopy, the solar cell assembly providing electrical power to charge the battery pack.

7. The stroller of claim 5 wherein the battery pack is a 24 volt rechargeable storage battery pack, and wherein the motor comprises a 12 to 19 volt electric motor.

8. The stroller of claim 7 wherein the at least one driven wheel comprises one driven rear wheel.

9. The stroller of claim 7, wherein the at least one driven wheel comprises two driven opposing rear wheels, and wherein the wheel drive shaft extends between the two driven wheels, wherein at least one driven wheel further comprise drive teeth disposed on an inner facing perimeter of the wheel, the drive teeth engaging with a ratchet pawl drive connected to an end of the wheel drive shaft, wherein the pawl driven wheel is permitted to rotate faster than non-pawl driven wheel such that the stroller can be easily steered while rolling.

10. The stroller of claim 7 further comprising a 24 volt solar cell assembly secured to a top portion of the canopy, the solar cell assembly electrically connected to the battery terminals in the battery receiving compartment, the solar cell assembly providing electrical power to charge the 24 volt battery pack.

* * * * *